F. A. CLOSE.
DEVICE FOR BORING AXIALLY CURVED HOLES.
APPLICATION FILED JAN. 15, 1916.
1,223,938.
Patented Apr. 24, 1917.
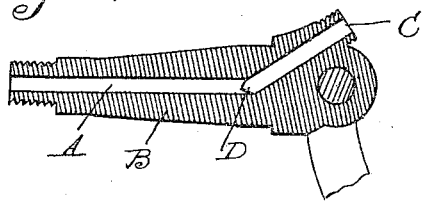
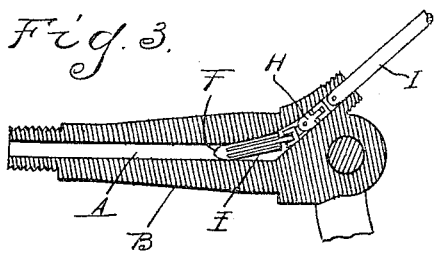
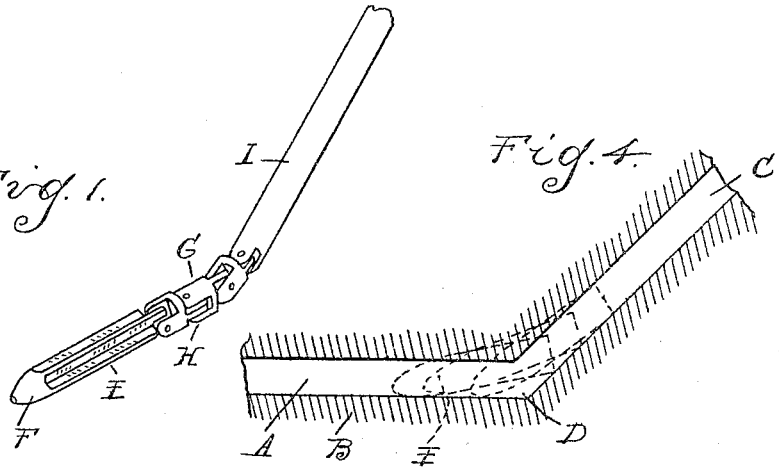
Inventor
Fred A. Close
By Whittemore Hulbert & Whittemore
Attorneys

UNITED STATES PATENT OFFICE.

FRED A. CLOSE, OF UNIONTOWN, PENNSYLVANIA, ASSIGNOR OF ONE-HALF TO GEORGE W. DUNHAM, OF DETROIT, MICHIGAN.

DEVICE FOR BORING AXIALLY-CURVED HOLES.

1,223,938. Specification of Letters Patent. Patented Apr. 24, 1917.

Original application filed September 13, 1915, Serial No. 50,331. Divided and this application filed January 15, 1916. Serial No. 72,202.

*To all whom it may concern:*

Be it known that I, FRED A. CLOSE, a citizen of the United States of America, residing at Uniontown, in the county of Fayette and State of Pennsylvania, have invented certain new and useful Improvements in Devices for Boring Axially-Curved Holes, of which the following is a specification, reference being had therein to the accompanying drawings.

The invention relates to tools particularly designed for use in the formation of curved holes, and comprises the novel construction as hereinafter set forth.

In the drawings:

Figure 1 is a perspective view of the tool;

Fig. 2 is a section through an axle spindle showing a preliminary operation before using the tool;

Fig. 3 is a similar view showing the tool in use; and

Fig. 4 is a diagram illustrating the operation of the tool.

My improved tool is particularly designed for cutting away angles in intersecting angular bores so as to produce a connecting curve to which said angular bores are tangent. In various mechanical constructions such bores are useful, but the specific illustration is an axle spindle and the formation of a curved bore therein for a speedometer drive.

Preliminary to the operation of my tool, intersecting angular bores are formed by straight drills, and as shown A is a bore extending axially of the spindle B, and C is an angular bore adjacent to the pivot of the spindle, which at its inner end intersects with the bore A, forming the angle D. The tool comprises a reamer E having a tapering smooth nose F at its forward end and at its rear end connecting with a flexible drive-shaft G formed of short links H alternately transversely pivoted to each other and connected to a shank I serving as a drive shaft. This tool may be inserted into one of the bores such as C, and pressed inward until the smooth nose F bears against the wall of the axial bore A. The shank is then driven and pressed inward, which will result in causing the reamer E to cut away the inner angle and to produce a curve, the radius of which is determined by the length of the reamer and the angle of the bores.

What I claim as my invention is:—

1. A curve-boring tool, comprising a short length reamer having a smooth tapering nose, and a flexible shaft directly forming the shank of said reamer and adapted to impart a driving torque and longitudinal thrust thereto.

2. A curve-boring tool, comprising a short length reamer having a tapering nose, a straight rigid shank and a connection between said reamer and shank allowing universal motion of the former, relative to the latter.

3. A curve-boring tool, comprising a short length reamer having a tapering nose, a shank constituting a drive-shaft for said reamer and a plurality of links forming the driving connection between the reamer and said shank, said connection allowing the axis of the reamer to assume various angular relations with that of the shank.

In testimony whereof I affix my signature in presence of two witnesses.

FRED A. CLOSE.

Witnesses:
JOHN C. REISINGER,
J. H. KOMENSKY.

Copies of this patent may be obtained for five cents each, by addressing the "Commissioner of Patents, Washington, D. C."